United States Patent [19]

Noguchi

[11] Patent Number: 4,578,577
[45] Date of Patent: Mar. 25, 1986

[54] LIGHT BEAM SCANNING DEVICE

[75] Inventor: Masaru Noguchi, Kanagawa, Japan

[73] Assignee: Fuji Photo Film Co., Ltd., Kanagawa, Japan

[21] Appl. No.: 497,935

[22] Filed: May 25, 1983

[30] Foreign Application Priority Data

May 31, 1982 [JP] Japan .................. 57-92787

[51] Int. Cl.$^4$ ............................... H01J 3/14
[52] U.S. Cl. ................... 250/235; 250/237 R; 350/6.1; 358/264; 358/293
[58] Field of Search ............ 358/199, 204, 264, 216, 358/293; 250/234, 235, 236, 237 R; 350/6.1, 6.9

[56] References Cited

U.S. PATENT DOCUMENTS 4,429,220  1/1984  Noguchi ................. 250/236
4,449,046  5/1984  Zuckerman et al. ........ 250/235

FOREIGN PATENT DOCUMENTS 0159615  12/1981  Japan ................... 350/6.1

Primary Examiner—John K. Corbin
Assistant Examiner—R. Eyssallenne
Attorney, Agent, or Firm—Sughrue, Mion, Zinn, Macpeak and Seas

[57] ABSTRACT

A light beam scanning reticle having a grid pattern with transparent portions and opaque portions alternately arranged in a light beam deflection direction and having a variable period in a direction perpendicular to the deflection direction. The grid pattern is movable in the deflection direction, and irregularity in the speed of scanning a light spot on a scanning plane is corrected with a photo-electric signal which is provided through the grid pattern.

6 Claims, 6 Drawing Figures

SCANNING DIRECTION

SCANNING DIRECTION

LIGHT BEAM SCANNING DEVICE

BACKGROUND OF THE INVENTION

This invention relates to a light beam scanning device in which the scanning speed irregularity of a light beam on a scanning surface is corrected and the scanning timing can be finely adjusted.

There are a variety of light beam scanning devices in which a light beam is deflected, so that data is recorded on a recording material placed on the scanning plane of the light beam, or data is read out of an original placed on the scanning plane. The light beam deflectors of these devices are, in general, vibrating mirrors such as galvanometers, or rotary multi-mirrors. In such devices, it is desirable that the light spot on the scanning surface is scanned at a uniform speed. If the scanning speed is irregular, the recorded pattern or the pattern which is obtained by reproducing the data signals read out is distorted. For instance, in the case where the galvanometer is used, the scanning speed is considerably irregular when the accuracy of forming a sawtooth drive signal and the response accuracy or repetition accuracy of the galvanometer are taken into consideration. The irregularity is, in general, increased as the speed is increased. In the case where a rotary multimirror is used, it is very difficult to rotate it at a constant speed. Accordingly, the light spot scanning speed is liable to be unstable.

The above-described irregularity or instability of the optical spot may be substantially eliminated by a known method in which a grid pattern comprising transparent portions and opaque portions arranged alternately with a predetermined period and in a canning direction is placed on a plane which is substantially equivalent to the scanning surface on which data is recorded or read. A photo-electric signal obtained through the grid pattern is employed as a scanning reference signal. FIGS. 1, 2 and 3 show examples of a light beam scanning device employing this method. In these figures, reference numeral 1 designates an optical deflector; 2, a scanning lens; 3, a scanning plane on which a recording material or an original is placed; 5, a grid pattern on a reticle; 6, a condenser lens; 7, a photo-detector; 8, a first laser beam (indicated by the solid line) for scanning a recording material or an original; and 9, a second laser beam (indicated by the broken line) for scanning the grid pattern.

In the device of FIG. 1, the first and second laser beams 8 and 9 are substantially coaxially applied to the deflector 1. These laser beams are deflected by the deflector 1, passed through the scanning lens 2, and separated by a beam splitting mirror 4. As a result, the first laser beam scans the scanning plane 3 on which a recording material or original is placed, while the second laser beam scans the grid pattern 5 on the reticle.

In the device of FIG. 2, the first and second laser beams 8 and 9 are applied to the optical deflector 1 at different angles. In this case, the two laser beams are applied from both sides of the vibrating mirror. The first laser beam 8 is deflected by the vibrating mirror 1 and passes through the first scanning lens 2, to scan the scanning plane 3 on which a recording material or original is disposed. the second laser beam 9 is deflected by the rear surface of the vibrating mirror 1 and passes through the second scanning lens 2', to scan the grid pattern 5.

The device shown in FIG. 3 is excellent in performance and preferable in terms of manufacturing cost. The first laser beam 8 is deflected by the optical deflector 1 which is a vibrating mirror and passes through the scanning lens 2 to scan the scanning plane 3 on which a recording material or original is placed. The second laser beam 9 is applied through a focusing lens 10 to the rear surface of the vibrating mirror to be deflected. Hence, scanning the grid pattern 5 is arranged in the deflecting plane along a circumference with the beam deflecting point as its center. The focusing lens 10 operates to focus the laser beam 9 on the grid pattern 5.

In each of the methods described with reference to FIGS. 1, 2 and 3, the laser beam modulated by the grid pattern is concentrated on the optical detector 7 by the condenser lens 6, so that the scanning is timed with the resultant photo-electric signal as a reference signal. In general, the scanning lens 2 is an fθ lens. In this case, the grid pattern 5 is made up of transparent and opaque portions which are alternately provided with a predetermined period.

In the above-described conventional light beam scanning devices, the period of the grid pattern is fixed, and accordingly, only one photo-electric signal is obtained as the scanning reference signal. This is disadvantageous in the case where it is necessary to finely adjust the scanning timing. A typical example where it is necessary to finely control the scanning time is the case where the light beam scanning is applied to a laser printer or laser COM as in this invention. For instance, with the laser printer, a scanning laser beam is used to print the output data of an electronic computer on a sheet on which a form including lists and frames has been printed, or to print the data on a blank sheet together with a form which is exposed to light through a separate optical system.

In this case, the laser beam scanning timing should be determined so that the size of the data is in agreement with the form whose size is predetermined. The accuracy required in this case is very high, $1/3,000 \div 0.03\%$ where the number of points to be resolved on the scanning line is 3,000 and the allowable error is one (1) in the number of resolution points. In order that the conventional art realizes this high accuracy, the focal length of the fθ lens, the period of the grid pattern and the adjustment of the entire optical system must be extremely high in accuracy. This increases the manufacturing cost of the device.

SUMMARY OF INVENTION

An object of this invention is to provide a light beam scanning device in which the scanning timing is high in accuracy.

Another object of this invention is to provide a light beam scanning device in which the scanning timing is high in accuracy, without increasing the manufacturing cost.

A further object of the invention is to provide a light beam scanning device which can finely adjust the scanning timing to be high in flexibility.

The foregoing and other objects of the invention have been achieved by the provision of a light beam scanning reticle which, according to the invention, comprises: a grid pattern having transparent portions and opaque portions arranged alternately in a light beam deflection direction and being variable in period in a direction perpendicular to the deflection direction. The grid pattern is movable in the deflection direction, and in which irregularity in the speed of scanning a light spot on a scanning plane is corrected with a photoelectric signal which is provided through the grid pattern.

This invention will be described in greater detail by referring to the accompanying drawing and the description of the preferred embodiment that follows.

DESCRIPTION OF THE PREFERRED EMBODIMENT

This invention will now be described in detail with reference to FIGS. 4 and 5.

Figure 1:
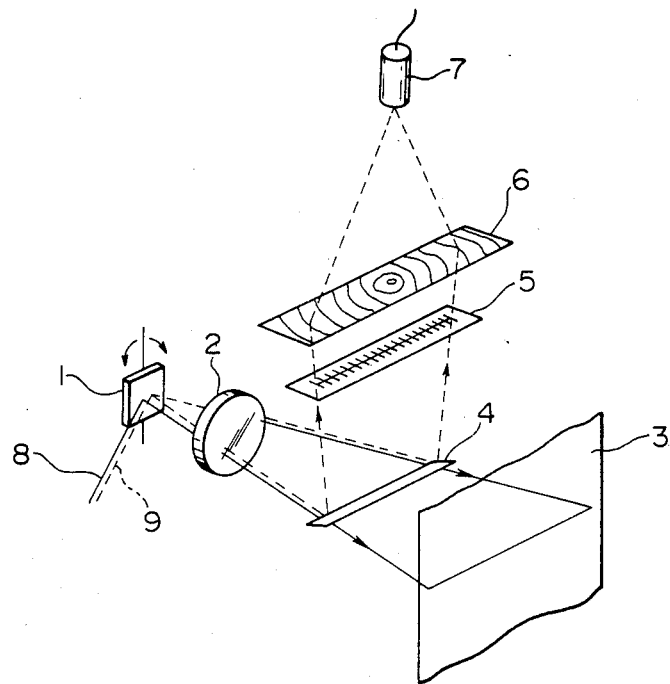
FIGS. 1, 2, and 3 are explanatory diagrams showing typical examples of conventional light beam scanning devices.
Figure 2:
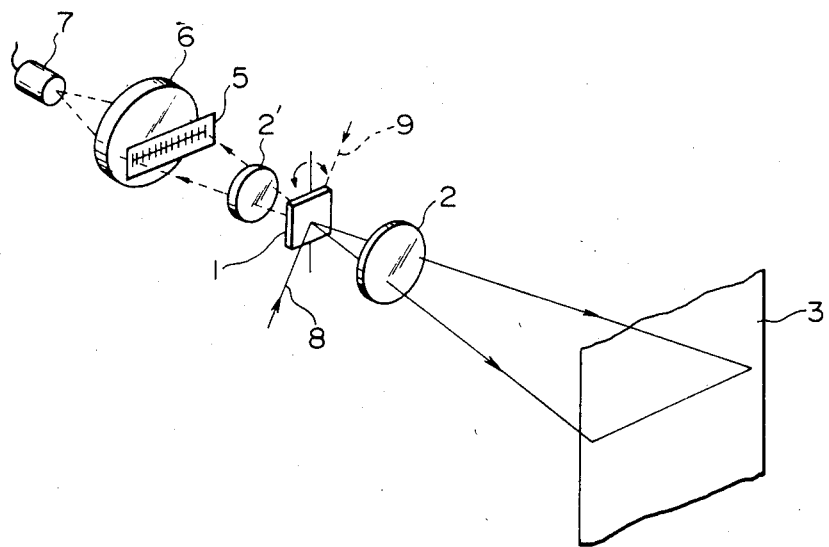

The invention can be utilized with any one of the conventional devices which have been described with reference to FIGS. 1, 2 and 3. In accordance with the invention, the grid pattern is not a parallel pattern having a constant period. That is, as shown in FIGS. 4A or 4B, the period is variable in a direction perpendicular to the scanning direction. However, it should be noted that the size of the grid pattern itself depends on which of, for example, the three systems shown in FIGS. 1, 2 and 3 is selected.

It is assumed that, as shown in FIGS. 4A or 4B, the original design value of the pattern width of a grid plate 5' is represented by Lt, and its pattern width at the top is $Lt - \Delta L$, while its pattern width at the bottom is $Lt + \Delta L$. In this case, when the grid pattern 5' is moved in a direction perpendicular to the scanning direction of the scanning light beam, then frequency of the resultant photo-electric signal can be adjusted by $\pm(\Delta L/Lt) \times 100\%$. This means that the effective scanning length can be adjusted as much as this rate.

Figure 3:
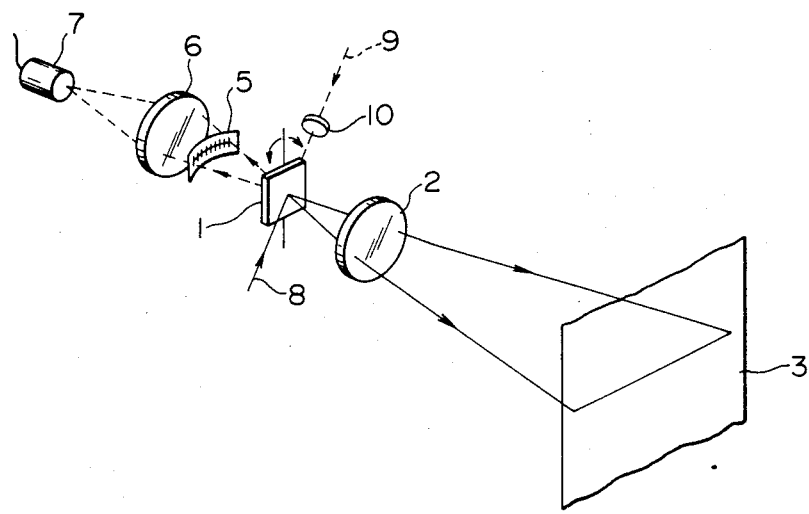
Figure 4A:
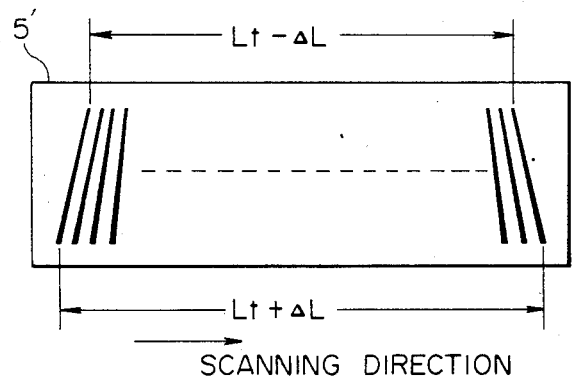
FIG. 4A and FIG. 4B are explanatory diagrams of examples of grid patterns employed in this invention.
Figure 4B:
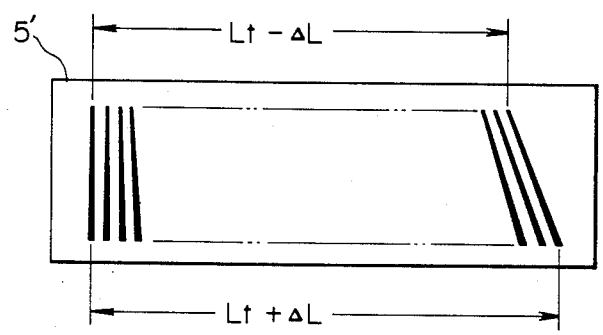
Figure 5:
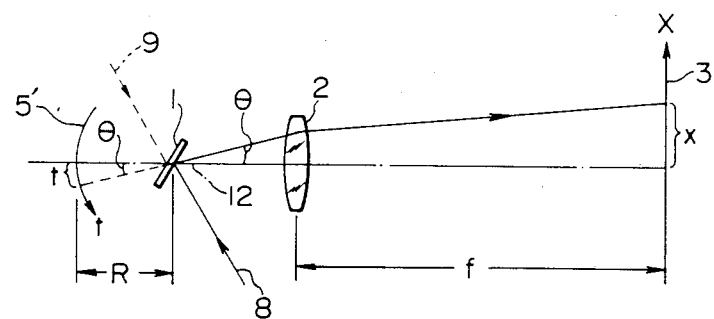
FIG. 5 is a plan view showing a portion of one example of a light beam scanning device according to the invention.

FIG. 5 is a plan view showing a portion of the light beam scanning device which is provided by using the grid pattern 5' shown in FIGS. 4A or 4B in place of the grid pattern 5 of the conventional light beam scanning device shown in FIG. 3. As the vibrating mirror 1 deflects an angle $\theta/2$ about the deflecting center, each of the first and second laser beams 8 and 9 is deflected through an angle $\theta$ from the reference direction 12 which corresponds to the optical axis of the scanning lens 2 and the central axis of the grid pattern 5'. In the case when the scanning lens 2 is an f$\theta$ lens having a focal length f, the spot position x of the deflected first laser beam on the scanning plane 3 is:

$$x = f \cdot \tan\theta \quad (1)$$

On the other hand, the spot position t of the deflected second laser beam is represented by the following expression (2):

$$t = R \cdot \theta \quad (2)$$

where, R is the radius of curvature of the grid pattern, the center of which is the deflecting center (on the rear surface of the vibrating mirror 1) of the second laser beam 9.

The spot position t is on the grid pattern.

From the expressions (1) and (2), and for $\theta << 1$, $$x/t = f/R \quad (3)$$

Expression (3) indicates that the spot position x of the first laser beam on the scanning plane 3 and the spot position t of the second laser beam on the grid pattern 5' are in proportion to each other through a factor (f/R) which is not related to the laser beam deflection angle $\theta$. Therefore, if the grid pattern is designed to have a constant period and the light spot, which scans the scanning plane 3, is timed with the photoelectric signal which has been modulated with the grid pattern thus designed, then the scanning speed irregularity is corrected. In the case where the grid pattern 5' is formed as shown in the FIGS. 4A or 4B, the data t in expression (3) can be adjusted as much as the rate of $\pm(\Delta L/Lt) \times 100\%$. Therefore, the spot position x on the scanning plane is adjusted as much as the same rate; that is, the scanning effective length can be adjusted as much as the rate.

Consider the case where this system is applied to a laser printer. It is assumed that the effective scanning length on the scanning plane 3 is Lx=297 mm which is equal to the long side of a size "A4" sheet. If it is intended to obtain the effective scanning length Lx with a deflecting angle $2\theta=30°$, then the focal length of the f$\theta$ lens is $f = Lx/2\theta = 567$ mm. It is assumed that the number of picture elements to be resolved in the range of effective scanning length is N=3,000. In general, a clock pulse corresponding to picture elements is formed by multiplying the photoelectric signal which is provided by means of the grid pattern 5'.

If the factor of multiplication is ten (10), then in the example in question, a grid pattern of 300 line pairs is necessary in correspondence to the effective scanning length. In the case where the radius of curvature of the grid pattern is R=60 mm, the ideal value of the grid pattern width is $Lt = R \cdot 2\theta = 31.4$ mm. In order to provide the grid pattern having 300 line pairs in this width, its period must be 104.7 $\mu$m/line pair. If the tolerance for the scanning timing error is for one picture element as described before, a high accuracy of 1/3,000=0.03% is required after taking errors in the focal length of the f$\theta$ lens, the width of the grid pattern and the arrangement of the optical system into account. However, for instance, in the case of the f$\theta$ lens, the accuracy for its focal distance is of the order of 0.1% at best; thus, it is substantially impossible to realize such a high accuracy as required here.

Accordingly, in the invention, the grid pattern 5 is formed as shown in FIGS. 4A or 4B. If, in the example, $\Delta L=3$ mm with respect to Lt=31.4 mm, then an error up to $\pm(\Delta L/Lt) \times 100 = \pm 9.6\%$ can be corrected. Adjustment for this purpose is carried out by moving the grid pattern 5' in the direction perpendicular to the scanning direction with a vernier head. In the case where the light beam scanning device is applied to a laser printer, it is necessary to adjust the size of data to be printed with the laser beam so that it is in agreement with the size of the form.

When the grid pattern is moved in a direction perpendicular to the scanning direction, the scanning start point is varied in the case of FIG. 4A, and is constant in the case of FIG. 4B. Therefore, sometimes the pattern in FIG. 4B is preferable. However, the pattern in FIG. 4A will cause no trouble if electrical correction is employed in combination.

The case where the invention is practiced on the conventional light beam scanning device shown in FIG. 3 has been described. However, the invention can be realized on the light beam scanning device shown in FIGS. 1 or 2. Furthermore, the invention can be practiced on other light beam scanning devices. For instance, the invention can be embodied on a light beam scanning device in which a rotary multi-mirror, an (acousto-optic) light deflector or a hologram light deflector is employed as its light deflector. The invention may be applied not only to the laser printer described above, but also to other picture devices such as a laser commuciation device, a laser facsimile and a laser printing plate forming device, in which a light beam is scanned to record pictures or to read originals.

As described in detail, the invention provides the light beam scanning device having the function of finely adjusting the scanning timing. Thus, high accuracy can be obtained without increasing the manufacturing costs of the device.

I claim:

1. A light beam scanning reticle comprising:
a grid pattern having alternate transparent and opaque portions arranged side by side in a row, said row being in a light beam deflection direction, said grid pattern having a plurality of spaced apart portions, wherein said spacing varies in a direction perpendicular to said deflection direction; wherein, a light spot, generated by said light beam, is moved across both a scanning plane and said grid pattern, wherein said light beam passes through said grid pattern to an optical detector which generates a photo-electric signal, wherein any irregularity in the speed of the light spot on the scanning plane is corrected in response to said photo-electric signal.

2. The reticle of claim 1, wherein said grid pattern has a median width defined as Lt and said pattern width along one edge is $Lt-\Delta L$ and said pattern width along another edge is $Lt+\Delta L$.

3. The reticle of claim 2, wherein said grid pattern has a upper and a lower edge, wherein said upper edge has a width of $Lt-\Delta L$.

4. The reticle of claim 2, wherein one end of said grid pattern is defined as a scanning start portion in which said portions are uniformly spaced, and wherein the remainder of said grid pattern comprises a plurality of variable spaced portions.

5. The reticle of claim 3, wherein one end of said grid pattern is defined as a scanning start portion in which said portions are uniformly spaced, and wherein the remainder of said grid pattern comprises a plurality of variable spaced portions.

6. The reticle of claim 1 further comprising a first laser source, an optical deflector deflecting a beam from said first laser source onto said scanning plane, a second laser emitting a second beam deflected by said optical deflector onto said reticle in correspondence with deflection of said beam from said first laser, and detector means receiving the light output of said reticle.

* * * * *